United States Patent
Kumar et al.

(10) Patent No.: US 12,251,838 B2
(45) Date of Patent: Mar. 18, 2025

(54) SYSTEM AND/OR METHOD FOR ERROR COMPENSATION IN MECHANICAL TRANSMISSIONS

(71) Applicant: Orangewood Labs Inc., Simi Valley, CA (US)

(72) Inventors: Abhinav Kumar, Simi Valley, CA (US); Aditya Bhatia, Simi Valley, CA (US); Akash Bansal, Simi Valley, CA (US); Anubhav Singh, Simi Valley, CA (US); Ashutosh Prakash, Simi Valley, CA (US); Aman Malhotra, Simi Valley, CA (US); Harshit Gaur, Simi Valley, CA (US); Prasang Srivasatava, Simi Valley, CA (US); Ashish Chauhan, Simi Valley, CA (US)

(73) Assignee: Orangewood Labs Inc., Simi Valley, CA (US)

( * ) Notice: Subject to any disclaimer, the term of this patent is extended or adjusted under 35 U.S.C. 154(b) by 0 days.

(21) Appl. No.: 18/388,738

(22) Filed: Nov. 10, 2023

(65) Prior Publication Data

US 2024/0075614 A1    Mar. 7, 2024

Related U.S. Application Data

(63) Continuation of application No. 17/481,136, filed on Sep. 21, 2021, now abandoned, which is a (Continued)

(51) Int. Cl.
B25J 9/16    (2006.01)
B25J 9/10    (2006.01)
(Continued)

(52) U.S. Cl.
CPC ............... *B25J 9/163* (2013.01); *B25J 9/103* (2013.01); *B25J 9/1641* (2013.01); *B25J 9/1653* (2013.01); *B25J 13/088* (2013.01); *B25J 17/025* (2013.01)

(58) Field of Classification Search
CPC . B25J 9/103; B25J 9/163; B25J 9/1641; B25J 9/1653; B25J 13/088; B25J 17/025; G05B 19/404; F16H 2057/123
See application file for complete search history.

(56) References Cited

U.S. PATENT DOCUMENTS 4,763,276 A     8/1988  Perreirra et al.
10,081,102 B1 * 9/2018  Berkowitz .............. F16H 57/12
(Continued)

OTHER PUBLICATIONS

Zhe, Li , et al., "A data-driven method based 1 on deep belief networks for backlash error prediction in machining centers", Journal of Intelligent Manufacturing, Springer US, New York, vol. 31, No. 7, Dec. 19, 2017 (Dec. 19, 2017), pp. 1693-1705, XP037229493, ISSN: 0956-5515, DOI: 10.1007/S10845-017-1380-9 [retrieved on Dec. 19, 2017].

*Primary Examiner* — Dale Moyer
(74) *Attorney, Agent, or Firm* — Jeffrey Schox

(57) ABSTRACT

The system can include a set of joints, a controller, and a model engine; and can optionally include a support structure and an end effector. Joints can include: a motor, a transmission mechanism, an input sensor, and an output sensor. The system can enable articulation of the plurality of joints.

19 Claims, 11 Drawing Sheets

Related U.S. Application Data continuation of application No. 17/229,328, filed on Apr. 13, 2021, now Pat. No. 11,148,287.

(60) Provisional application No. 63/008,952, filed on Apr. 13, 2020.

(51) Int. Cl.
*B25J 13/08* (2006.01)
*B25J 17/02* (2006.01)

(56) References Cited

U.S. PATENT DOCUMENTS

| | | | |
|---|---|---|---|
| 11,148,287 | B1 | 10/2021 | Kumar et al. |
| 2004/0015933 | A1 | 1/2004 | Campos et al. |
| 2008/0004724 | A1* | 1/2008 | Stahl-Gunarsson ......................... G05B 19/404 700/71 |
| 2008/0140321 | A1 | 6/2008 | Blanc et al. |
| 2016/0039092 | A1* | 2/2016 | Harada ................ G05B 19/404 901/41 |
| 2016/0229056 | A1 | 8/2016 | Takagi |
| 2017/0015004 | A1* | 1/2017 | Osaka .................... B25J 9/1641 |
| 2018/0241283 | A1 | 8/2018 | Kokubo et al. |
| 2018/0361592 | A1* | 12/2018 | Motoyoshi ............. B25J 9/0087 |
| 2020/0278646 | A1 | 9/2020 | Sakiyama et al. |
| 2020/0298403 | A1 | 9/2020 | Nilsson et al. |
| 2021/0008712 | A1 | 1/2021 | Giovannitti et al. |
| 2021/0114217 | A1* | 4/2021 | Kikuchi ................. B25J 9/1674 |
| 2023/0041248 | A1* | 2/2023 | Ramakrishnan .......... H02P 8/00 |

* cited by examiner

SYSTEM AND/OR METHOD FOR ERROR COMPENSATION IN MECHANICAL TRANSMISSIONS

CROSS REFERENCE TO RELATED APPLICATIONS

This application is a continuation of U.S. application Ser. No. 17/481,136, filed 21 Sep. 2021, which is a continuation of U.S. application Ser. No. 17/229,328, filed 13 Apr. 2021, which claims the benefit of U.S. Provisional Application No. 63/008,952, filed 13 Apr. 2020, both of which are incorporated herein in their entirety by this reference.

TECHNICAL FIELD

This invention relates generally to the mechanical transmission systems field, and more specifically to a new and useful error compensation system and/or method in the mechanical transmission systems field.

BACKGROUND

Mechanical transmission mechanisms can enable systems to gear actuators up (to operate at higher speeds) or down (to react higher torque loads), but they also can introduce positional error in the system, which negatively impacts system performance. One example of such error is backlash that occurs in gear systems. Backlash is generally known in the mechanical arts as an inefficiency that results from clearance or lost motion in mechanism. Backlash is typically caused by gaps between parts (e.g., the circumferential space between two meshing gear teeth). Hardware solutions have been proposed to correct positional error in mechanical transmission systems. An example hardware solution is a harmonic drive specially designed to reduce or eliminate backlash. One such harmonic drive is the Strain Wave gear developed and sold by Harmonic Drive AG™. While the harmonic drives work well in eliminating error, they are highly complex mechanical systems and, as a result, are very expensive, sometimes prohibitively so for a commercial product.

Accordingly, there is a need for an improved technique to correct for cumulative errors in mechanical transmission systems.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
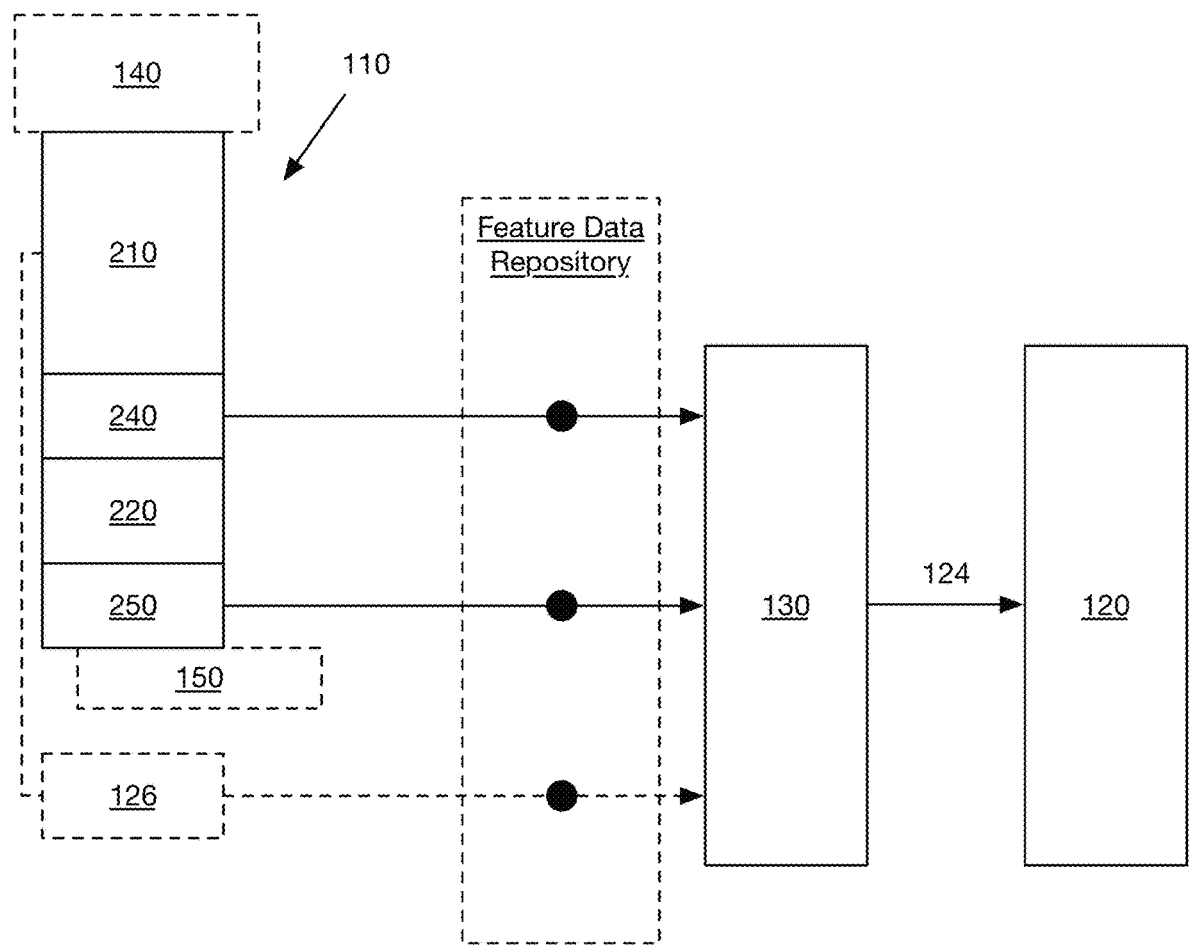
FIG. 1 is a schematic representation of a variant of the system.
Figure 2:
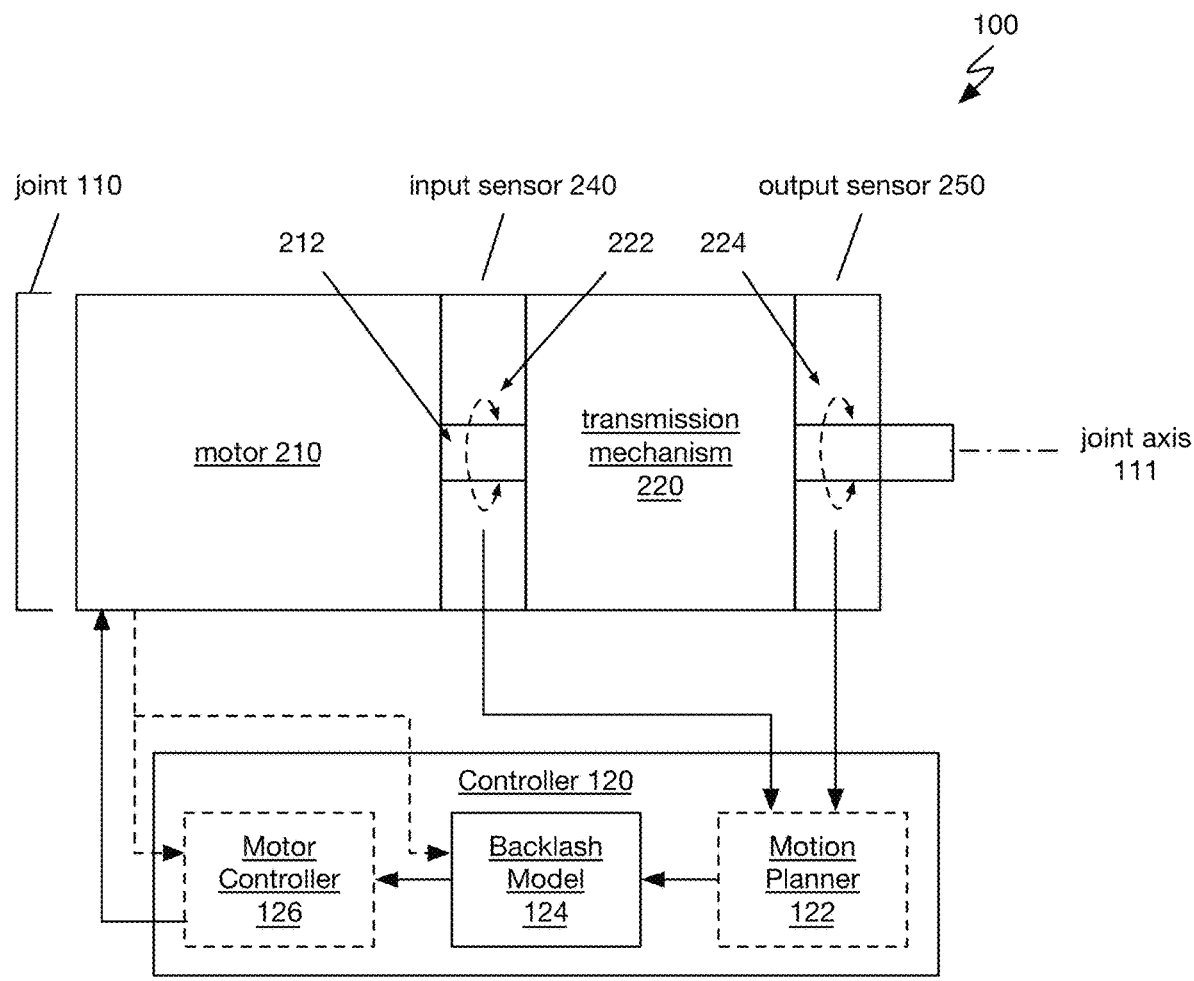
FIG. 2 is a schematic representation of a variant of the system.

The system 100, an example of which is shown in FIG. 1, can include a set of joints, a controller, and a model engine. The system can optionally include a support structure and an end effector. However, the system 100 can additionally or alternatively include any other suitable set of components.

The system 100 functions to enable articulation of the plurality of joints. Joints are preferably articulated by automatic control and/or can be configured to automatically execute control instructions (e.g., predetermined control instructions, dynamically determined control, etc.), however the system can alternatively be manually controlled. In a specific example, the system can be a computer numerical control (CNC) system. However, the system can otherwise suitably enable joint articulation.

The term "joint" can refer to a set of components which constrains actuation along a rotational, linear, and/or other single degree of freedom (DOF) of the system and/or along a single joint axis 111. In variants, joints can include revolute joints which constrains joint articulation to a rotation about a single axis. In a specific example, the system can be a 6-axis robotic arm which includes 6 actuatable "joints" associated with respective axes of the arm. However, joints can additionally or alternatively refer to any other suitable axis of actuation and/or have any other suitable meaning.

The term "substantially" as utilized herein can mean: exactly, approximately, within a predetermined threshold or tolerance, and/or have any other suitable meaning.

2. Benefits

Variations of the technology can afford several benefits and/or advantages.

First, variations of this technology can enable use of low-cost hardware by modeling and controlling based on the backlash in the system. In such variants, the system and/or method can tighten a control tolerance of actuation via high-backlash components (e.g., spur gears). In a specific example, tighter control tolerance can be achieved by modelling the transmission mechanism with "backlash-in-the-loop" (e.g., in a feedforward control configuration), initialized for the specific motor/transmission pair. In one example, the system can provide global positional tolerance of 1 mm (or better) for control of a 6-axis robotic arm using spur gears. In another example, the system can provide 0.05 deg rotational accuracy across the full range of a (rotational)

joint output. However, the technology can otherwise provide any suitable control tolerances for any suitable set of hardware.

Second, variations of this technology can enable initialization of a joint prior to forming an assembly with the joint, which can reduce the model training time and/or computational complexity. In such variants, joints can be modelled/characterized simultaneously and/or in parallel and subsequently formed into an assembly. Additionally, initializing joints prior to assembly can allow a full range of load cases (motor currents) to be modelled and/or allow the load to be controlled during joint initialization, which may otherwise be difficult during initialization/data generation of intermediate joints in some assemblies.

However, variations of the technology can additionally or alternately provide any other suitable benefits and/or advantages.

3. System

The system 100, an example of which is shown in FIG. 1, can include a set of joints 110, a controller 120, and a model engine 130. The system can optionally include a support structure 140 and an end effector 150. However, the system 100 can additionally or alternatively include any other suitable set of components.

The system 100 functions to enable articulation of the plurality of joints. Joints are preferably articulated by automatic control and/or can be configured to automatically execute control instructions (e.g., predetermined control instructions, dynamically determined control, etc.), however the system can alternatively be manually controlled. In a specific example, the system can be a computer numerical control (CNC) system. However, the system can otherwise suitably enable joint articulation.

Each joint of the set of joints functions to enable articulation in a single degree of freedom (DOF) of the system. The system can include a single joint; a plurality of joints, such as: two, three, five, six, seven, more than seven, any range bounded by the aforementioned values; and/or any other suitable number of joints. Joints can be identical or define the same type of articulation (e.g., rotational, linear, etc.), and/or can define different types of articulation. Joints can be mechanically connected in any suitable combination and/or permutation of series and/or parallel. In a specific example, each joint is mounted directly to a common base/frame. In a second example, a first joint is mounted directly to a base structure and a remainder of the joints of the set are indirectly connected to the base structure via the first joint, such that an articulation of the first joint transforms each of the remainder of joints. However, the joints can be connected in any other suitable manner and/or have any other suitable mechanical relationship.

Joints no can include: a motor 210, a transmission mechanism 220, an input sensor 240, and an output sensor 250.

The motor functions to actuate the joint and/or transform a drive (driving) end of the transmission mechanism. The motor preferably includes an output component 212 (e.g., motor shaft) which rotates relative to a body of the motor (e.g., housing; fixedly connected to a support structure such as a base). The motor can be an in-runner motor (e.g., where the output component is the rotor and/or is connected to the rotor), outrunner motor (e.g., where the output component is the stator and/or is connected to the stator), brushed motor, brushless motor, permanent magnet motor, induction motor, synchronous motor, asynchronous motor, stepper motor, servo motor, and/or any other suitable type of motor. The motor can be configured to receive a DC power input (e.g., BLDC) and/or AC input (e.g., 2-phase, 3-phase, 6-phase, etc.) from the controller. The motor can operate at a nominal voltage of 5V, 12V, 24V, 48V, 110V, 120V, 240V, 330V, 600V, any range bounded by the aforementioned values, and/or any other suitable voltage. The motor can have a power threshold (e.g., peak power, maximum continuous power, nominal power, max power of individual set of windings of dual-wound motor, etc.) of: 0.10 kW, 0.20 kW, 0.25 kW, 0.30 kW, 0.40 kW, 0.45 kW, 0.50 kW, any range bounded by the aforementioned values, and/or any other suitable power threshold. However, the motor can have any suitable power capabilities and/or requirements. The motor can operate at a speed threshold (e.g., nominal operating speed, unloaded speed, max speed, minimum speed, etc.) of: less than 100 RPM, 500 RPM, woo RPM, 1250 RPM, 1500 RPM, 1600 RPM, 1700 RPM, 2000 RPM, 5000 RPM, any range bounded by the aforementioned values, and/or any appropriate speed; while operating at a torque of: less than 0 N-m, 1.5 N-m, 1.6 N-m, 1.7 N-m, 2.3 N-m 2.4 N-m, 2.5 N-m, 3 N-m, 3.5 N-m, 4.5 N-m, 5 N-m, 10 N-m, greater than 10 N-m, any range bounded by the aforementioned values, and/or any appropriate torque. However, the motor can have any suitable torque/speed characteristics.

In variants, the motor is preferably fixedly mounted to a support structure, such as a base and/or spanning member (e.g., connecting output/driven end of a proximal joint to the motor of a distal joint; connecting two joints; etc.), with the output component configured to transform relative to the support structure and/or about a motor axis. The motor axis is preferably coaxial with a joint axis 101, but can additionally or alternatively be parallel with a joint axis (e.g., for transmission mechanisms relying wholly on spur gears), orthogonal to a joint axis (e.g., for a transmission mechanism relying on a worm gear and/or bevel gears), and/or have any other suitable relationship relative to the joint axis.

However, the joints can include any other suitable motors.

The transmission mechanism functions to transform the motor actuation into actuation about the axis and/or transform the actuation by a gearing ratio (e.g., gear the motor up/down). The transmission mechanism preferably defines a drive (driving) end 222 and a driven end 224. The drive end is preferably connected to the motor output component (e.g., motor shaft), but can additionally or alternatively be connected to an input sensor and/or can be otherwise suitably coupled to the motor. The drive end is preferably coaxial and/or aligned with the motor axis, but can be otherwise suitably arranged. Likewise, the driven end of the transmission mechanism preferably defines a joint axis and/or output articulation of the joint. The driven is preferably connected to the output sensor, but can additionally or alternatively be connected to a distal joint of the system (e.g., by a support member), an end effector, a test fixture (e.g., variable load) and/or can be otherwise suitably connected. The driven end can define a range of motion of the joint about the joint axis, which can be constrained by physical hardware (e.g., bounded by a physical contact, maximum strain of power/data cables) and/or software (e.g., limit switches, limited based on the position of the output sensor). In variants where the joint is rotational (e.g., revolute) and/or defines a rotation about the joint axis, the range of motion can span: less than 180 degrees, 180 degrees, 320 degrees, 359 degrees, 360 degrees, greater than 360 degrees, any range bounded by the aforementioned values, and/or any other suitable range of motion. In an example: the range of motion of a base (first) joint can be −180 degrees to +180 degrees about its axis; the range of motion of a shoulder (second) joint can be −90 degrees to +90 degrees about its axis; the range of motion of an elbow (third) joint can be −160 degrees to +160 degrees about its axis; the range of motion of a first wrist (fourth) joint can be −90 degrees to +90 degrees about its axis; the range of motion of a second wrist (fifth) joint can be −160 degrees to +160 degrees about its axis; and the range of motion of a third wrist (sixth) joint can be −180 degrees to +180 degrees about its axis.

The transmission mechanism can define a gear ratio between the drive (driving) end and the driven end, which (notated as output torque:input torque) can be 1:1, 10:1, 20:1, 30:1, 34:1, 35:1, 36:1, 38:1, 40:1 42:1, 45:1, 50:1, 60:1, 120:1, greater than 120:1, any range bounded by the aforementioned values, and/or any other suitable gear ratio.

The transmission mechanism can include gears, such as: spur gears (a.k.a. straight-cut gears; e.g., involute, cycloidal, etc.), helical gears, bevel gears, worm gears, and/or any other suitable types of gears. In a variant, the transmission mechanism can consist of spur gears (e.g., in a planetary drive configuration), which may provide a significant cost reduction in some cases. However, the transmission mechanism can include any other suitable gear type. The gears of the transmission mechanism can define drive arrangements such as: planetary drive, worm drive, bevel gearbox drive, helical gearbox drive, and/or any other suitable drive arrangement.

Based on the drive arrangement and/or gearing ratio (e.g., type of gear teeth, number of gear teeth, pressure angle of the teeth, etc.), the transmission mechanism can define a maximum backlash and/or backlash threshold along the joint axis, which can be: less than 0.01 degrees, 0.01 degrees 0.02 degrees, 0.05 degrees, 0.1 degrees, 0.12 degrees, 0.15 degrees, 0.2 degrees, greater than 0.2 degrees, any range bounded by the aforementioned values, and/or any other suitable backlash threshold. In a specific example, the maximum backlash exhibited by the transmission mechanism is greater than (e.g., double) the rotational tolerance along the joint axis. However, the drive arrangement of various joints can otherwise be provided to minimize and/or fully eliminate backlash (e.g., via a harmonic drive) in one or more joints of the system.

In variants, the backlash of the transmission mechanism can change (e.g., increase) as a result of mechanical wear. Accordingly, the backlash in the transmission mechanism can change (e.g., increase) over time, based on the operating time of the system and/or as a function of the number of cycles of the drive/driven ends.

In some variants, the transmission mechanism can optionally include a housing, which can be integrated into the gears of the transmission mechanism (e.g., where the housing comprises an involute spur gear of a planetary gearbox) and/or can be separate from the gears. The housing can function to retain and/or enclose the gears of the gearbox (e.g., IP65, IP67, etc.). The housing is preferably fixed relative to the body of the motor (e.g., mounted to a static portion of the motor relative to the motor axis) but can be otherwise suitably configured. Alternatively, the transmission mechanism can exclude a housing, and/or can be otherwise suitably configured.

The input sensor functions to measure a position of the drive (driving) end of the transmission mechanism and/or measure the motor output component. The input sensor is preferably an angular position sensor (e.g., for a rotary/revolute joint), but can be any other suitable type of sensor. The input sensor is preferably an absolute encoder, but can additionally or alternatively be an incremental encoder, and/or any other suitable positional sensor, such as a rotary potentiometer, a resolver, a Hall-effect sensor, and/or any other suitable type of position sensor. The input sensor is preferably magnetic, but can additionally or alternatively be optical, mechanical, or electromagnetic induction encoder. However, the input sensor can otherwise suitably measure an angular position of the drive end of the transmission mechanism.

The input sensor is preferably connected to the motor output component and/or the drive end of the transmission mechanism. In a first variant, the input sensor can be arranged between the motor and the transmission mechanism. In a second variant, the input sensor can be integrated into the motor. In a third variant, the input sensor can be connected to the motor output component at a rear end of the motor, opposing the transmission mechanism along a length of the motor. However, the input sensor can be otherwise suitably arranged, and/or otherwise suitably measure an input position (angle) of the drive end of the transmission mechanism.

However, the joints can include any other suitable input sensor.

The output sensor functions to measure a position of the driven end of the transmission mechanism. The output sensor is preferably the same type of sensor as the input sensor (e.g., identical), but can alternatively be a different type of sensor. The output sensor can be a rotary (angular) position sensor or a linear position sensor (e.g., for a linear joint, such as a linear stage of a CNC mill). The output sensor is preferably an absolute encoder, but can additionally or alternatively be an incremental encoder, and/or any other suitable positional sensor, such as a rotary potentiometer, a resolver, a Hall-effect sensor, and/or any other suitable type of position sensor. The input sensor is preferably magnetic, but can additionally or alternatively be optical, mechanical, or electromagnetic induction sensor. However, the input sensor can otherwise suitably measure a position of the drive end of the transmission mechanism.

The output sensor is preferably connected to a distal and/or driven end of the transmission mechanism, but can be otherwise suitably arranged. In variants, the output sensor is connected during an initialization sequence, such that the position measurements can be used to generate a data set to initialize the motor/transmission pair. In some variants, the output sensor can remain attached during and/or after the joint is assembled into an assembly such as a robotic arm. In such variants, the measurements of the output sensor can be used to update the model for the joint and/or can be used to control the joint (e.g., in a feedback loop). Alternatively, the output sensor can be optionally removed after the initialization sequence (e.g., after a model is trained for the joint). However, the output sensor can be otherwise integrated, and/or the joints can include any other suitable output sensor.

However, joints can include any other suitable components.

The system can optionally include a support structure, which functions to structurally support and/or connect joints of the system. Support structure can include a base and/or frame, which can mount one or more joints (e.g., a proximal/base joint of an arm). Support structure can include spanning members, which can extend between two joints and/or can be actuated by a proximal joint (e.g., driven end) while supporting and/or transforming a distal joint. The support structure can connect joints in series and/or parallel in any combination and/or permutation. In a first example, the system can be a robotic arm with each joint mechanically connected in series (an example is shown in FIG. 3B).

Figure 3A:
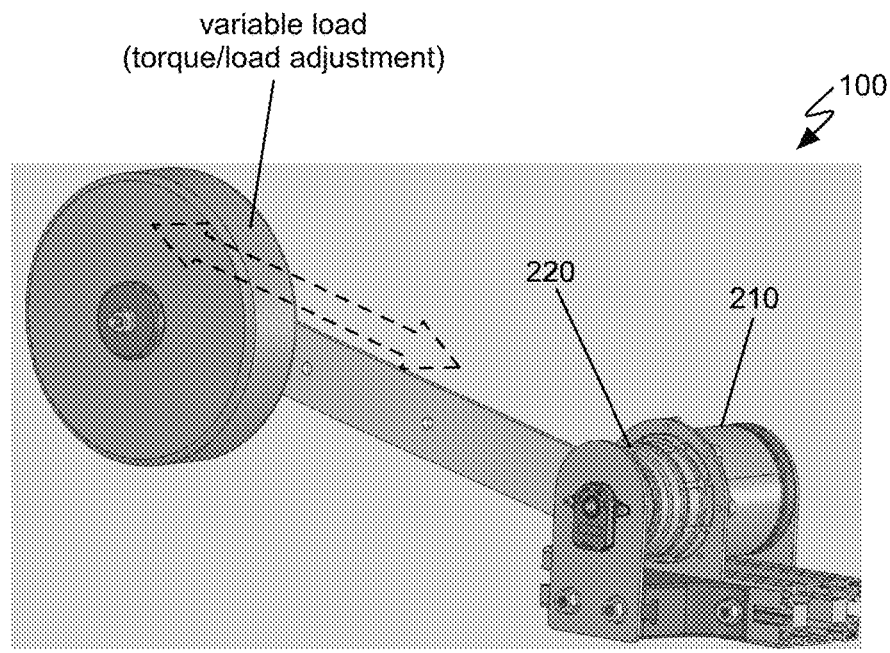
FIG. 3A is an example of a test bench for a variant of the system.
Figure 3B:
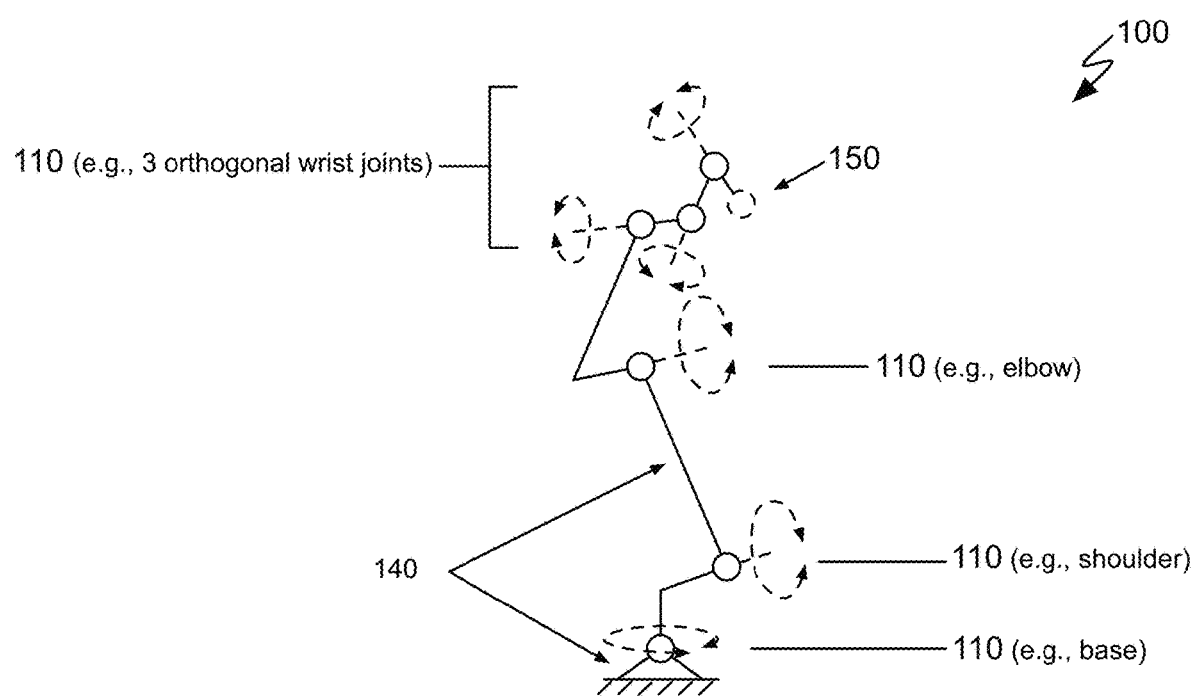
FIG. 3B is a schematic representation of a variant of the system.

Sequential joints which are mechanically connected in series by the support can have orthogonal joint axes (e.g., between a base joint and a shoulder joint—an example is shown in FIG. 3B; between each wrist joint; etc.), parallel joint axes (e.g., between a shoulder joint and an elbow joint—an example is shown in FIG. 3B), skewed joint axes, and/or any other suitable arrangement. However, the system can include any other suitable support structure.

The system can optionally include an end effector, which functions to interact with an environment and/or components external to the system. The end effector preferably connects to a distal and/or terminal joint of the system (e.g., relative to a base), but can be otherwise suitably arranged. The end effector can be impactive, ingressive, astrictive, contigutive, and/or any other suitable type of end effector. In a first specific example, the end effector can be a weld stick. In a second specific example, the end effector can be a cutting cool, such as an end mill or drill bit. However, the system can include any other suitable end effector.

The system can include a controller, which functions to control operation of the joints to transform the system (e.g., a motion of the end effector). The controller preferably controls the joint(s) according to a set of control instructions, which specify a position and/or trajectory of a joint(s) of the system. The control instructions can be machine readable instructions (e.g., G-code), but additionally or alternatively can be: manually specified by a user, automatically determined by the controller or a separate processor, dynamically determined, and/or otherwise suitably determined. The controller can execute control instructions in a feedforward and/or feedback control scheme, or otherwise suitably execute control instructions. The control scheme employed by the controller can be: linear control (e.g., PID, etc.), nonlinear control, model predictive control (MPC), LQR control, intelligent control (e.g., artificial neural networks, Bayesian probability, fuzzy logic, machine learning, evolutionary computation, genetic algorithms, and/or any combination thereof, etc.), adaptive control, machine learning based control schemes, any other suitable control scheme, and/or any combination thereof to control the joints.

In variants, the controller can optionally include a motion planner 122 which functions to determine control instructions for each joint. Alternatively, the control instructions can be received from a remote processor, and/or can be otherwise suitably determined.

The controller can include a backlash model 124, which functions to adjust control instructions based on a cumulative error (e.g., backlash) for a joint of the system. The backlash model 124 can be used by the motion planner 122, motor controller 126, joint controller, or by another component. The backlash model 124 can be used to transform the motion plan (e.g., waypoints, trajectories, etc.) output by the motion planner, transform the joint control instructions (e.g., degrees of joint rotation) generated from the motion plan, and/or otherwise used. The backlash model is preferably predetermined (e.g., static/unchanging during operation based on the control instructions), but can additionally or alternatively be updated with any suitable frequency (e.g., never, periodically, asynchronously with operation, synchronously with operation, etc.), dynamically modified (e.g., mutable during operation), and/or otherwise suitably implemented. The backlash model 124 can specify: the joint control adjustments that need to be made to a control instruction (for the joint to achieve a target output associated with the control instruction); a new set of joint control instructions associated with the target output; and/or other outputs. In variants, the backlash model can be updated in response to an output measurement exceeding a threshold deviation from the control instructions—such as if the measured position about the joint axis exceeds a control tolerance for the joint (e.g., 0.05 degrees, etc.). In a first variant, the backlash model can be a lookup table. The model can include a lookup table for each joint or angular position, a lookup table for each angular sector/range, and/or any other suitable set of lookup tables. The lookup table can specify: an equation (e.g., to calculate an adjustment specific to the angular range), an adjustment value (e.g., suggested or determined by reinforcement learning), a new control instruction, and/or other information. In a second variant, the backlash model can include a set of discrete models (e.g., linear models, piecewise linear model) cooperatively spanning a full actuation range of a joint. In a third variant, the backlash model can be a regression model. In a fourth variant, the backlash model can be a classification model (e.g., wherein the model classifies the input into a bucket associated with the backlash adjustment to be applied; incorporated with a reinforcement model; etc.). In an example, the backlash model can be a model trained according to S114.

However, the controller can include any other suitable backlash model.

The controller can optionally include a motor controller 126 transform the control instructions (e.g., control signal as adjusted based on the backlash model) into a supplied power provision to effect motion of the motor. In a first variant, the motor controller can include an inverter integrated into a body of the motor. In a second variant, the motor controller can be arranged proximal a base of the system, and power can be routed through/around each joint of the system. In a third variant, a first motor controller can be used while initializing the joint (e.g., during S112) and a second motor controller can be used during operation of the system (e.g., during S130). However, the system can include any other suitable motor controller, and/or otherwise exclude a motor controller.

The controller processing and/or motor control is preferably performed locally at a physical processor of the system, such as where the backlash model is stored offline in a memory of the controller, but can additionally or alternatively include online and/or remote trajectory/motion planning. In some variants, control instructions can be determined at a remote processor and/or received at the controller.

However, the system can include any other suitable controller.

The system can include a model engine, which functions to determine the backlash model to be employed by the controller. The model engine can be a machine learning engine which determines the backlash model based on the set of inputs feature by implementing: regression analysis (e.g., linear regression, kernel regression, logistic regression, polynomial regression, etc.), Bayesian networks, genetic algorithms, artificial neural networks, predictive decision trees, support-vector machines, and/or any other suitable ML analysis. However, the model engine can otherwise suitably determine the backlash model. The model engine can be located at the system (e.g., processing performed onboard the assembly, controller, or local device), remote (e.g., utilizing cloud computing), centralized (e.g., processing at a single compute node), distributed (e.g., processing at multiple compute nodes, etc.), and/or provided in any other suitable location(s). However, the system can include any other suitable model engine or otherwise exclude a model engine.

However, the system can include any other suitable components.

4. Method

Figure 4A:
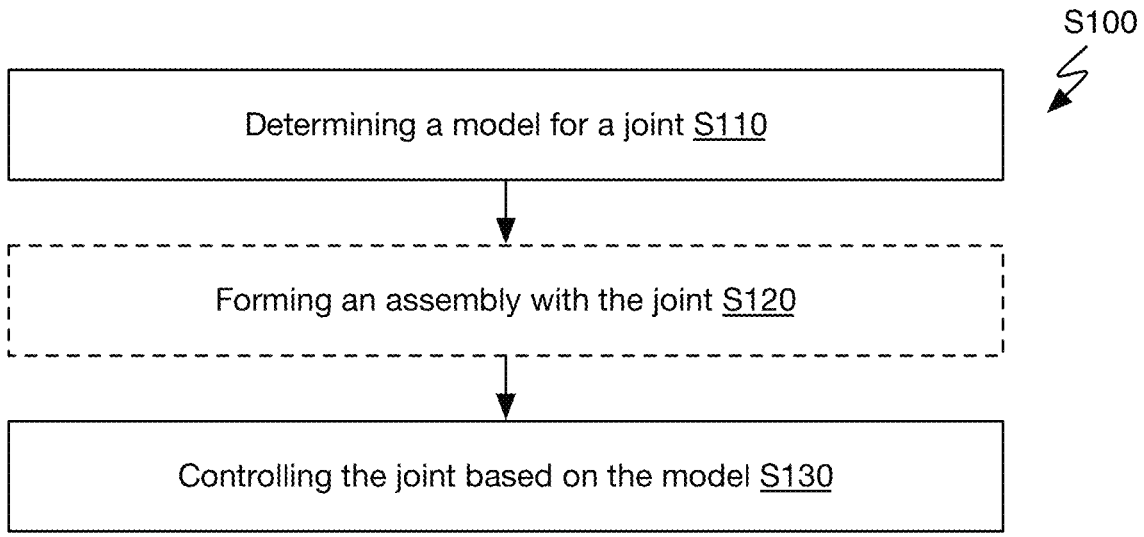
FIG. 4A is a diagrammatic representation of a variant of the method.

The method S100, an example of which is shown in FIG. 4A, can include: determining a model for a joint S110 and controlling the joint based on the model S130. The method S100 can optionally include forming an assembly with the joint S120. However, the method S100 can additionally or alternatively include any other suitable elements.

Figure 4B:
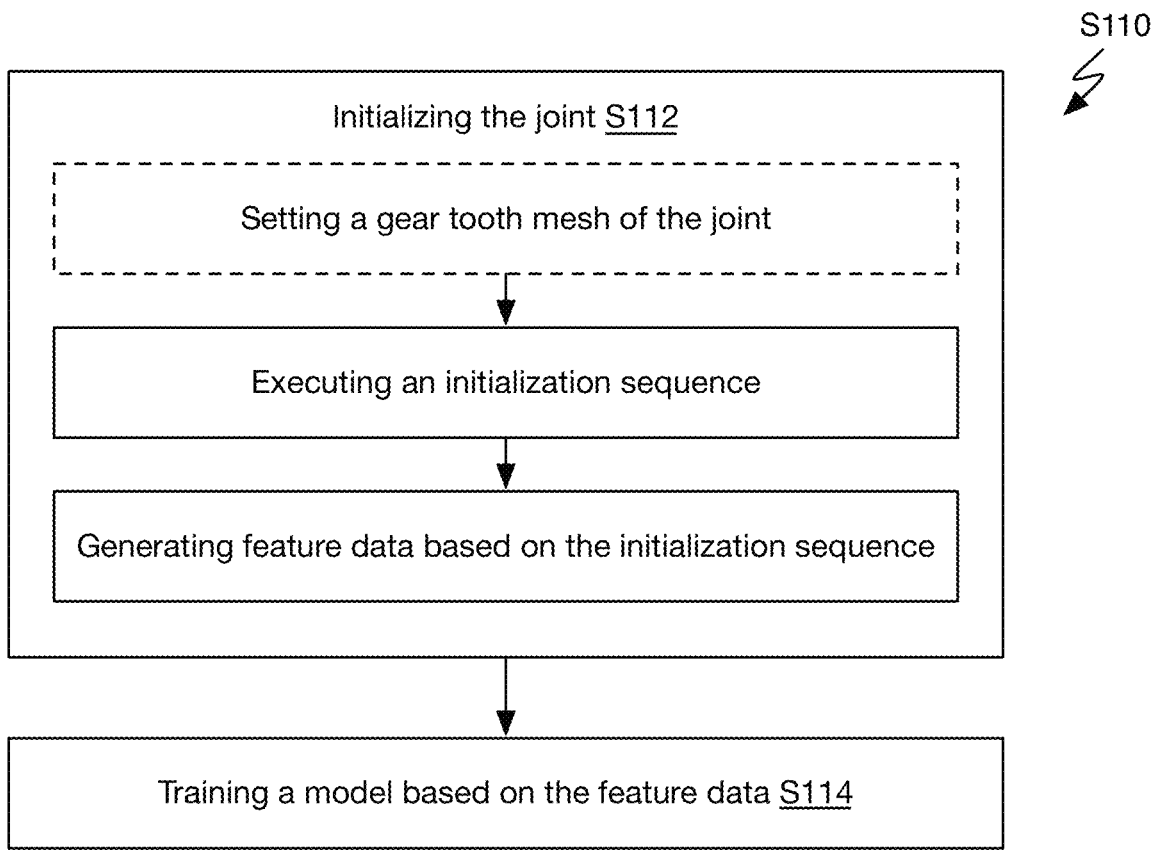
FIG. 4B is a diagrammatic representation of a variant of the method.
Figure 5A:
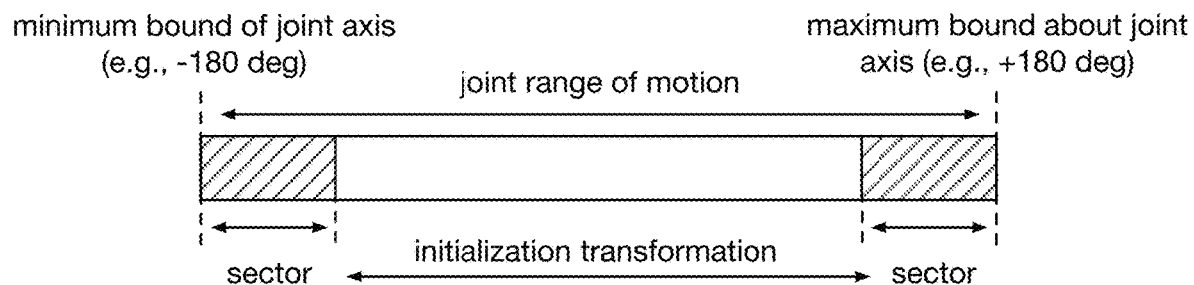
FIGS. 5A-D are schematic representations of transformations between sectors during an initialization sequence in a variant of the method.
Figure 5B:
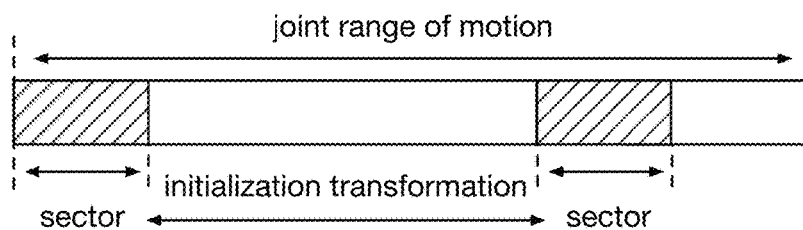
Figure 5C:
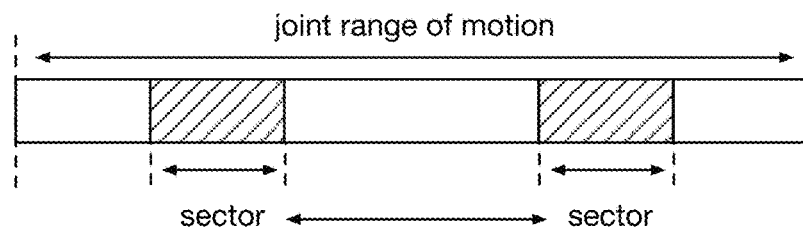
Figure 5D:
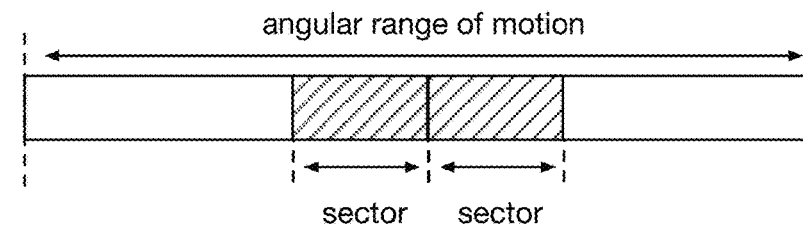

Determining a model for a joint S110 functions to determine a model to be used in control of the joint (e.g., in S130). S110, an example of which is shown in FIG. 4B, can include: initializing the joint S112 and training a model based on the feature data S114. The model is preferably determined so as to relate the behavior of gear tooth interactions in a specific meshed arrangement of the transmission mechanism, which can be advantageous because minor manufacturing deviations in a gear—even at micron granularity for individual teeth—can exhibit unique cumulative errors (backlash) across the span of the drive end of the transmission mechanism. Accordingly, where a 'home' position (or reference relative to the joint axis) of the drive/driven ends of the transmission remains fixed, the meshing contacts (or engaged teeth) of the gears is deterministic at each position of the joint about the joint axis. As a first illustrative example: if a planetary gearbox were disassembled, a gear removed, the gear rotated radially by an angular span of one or more teeth (thereby changing the tooth meshing in the gearbox), and the gear replaced at its new angular position (all else held constant), the backlash relationships within the gearbox may change. As a second illustrative example, a gearbox having a chipped/worn/deviant tooth may exhibit significant backlash differences based on the repeated engagement of the tooth (e.g., for a gearbox with a gear ratio of N:1, a deviant tooth located on the driving gear may be engaged N times per rotation about the joint axis, whereas a deviant tooth located on the driven gear be engaged 1 time per rotation about the joint axis; the cumulative error when a deviant tooth is located on the driving gear may be significantly greater than when the deviant tooth is located on the driven gear).

Models are preferably for each joint independently (e.g., independently of the state of attachment into an assembly), but can additionally or alternatively relate the cumulative error (backlash) of all joints within the assembly. Models of joints of an assembly can be trained in series (e.g., sequentially based on the order of attachment into an assembly) and/or in parallel (e.g., simultaneously, prior to attachment into an assembly). A unitary model or a plurality of models can be determined for each: joint of an assembly, arm of the assembly, angular regime about the joint axis, and/or there can be any other suitable number of models determined in S110.

Figure 11:
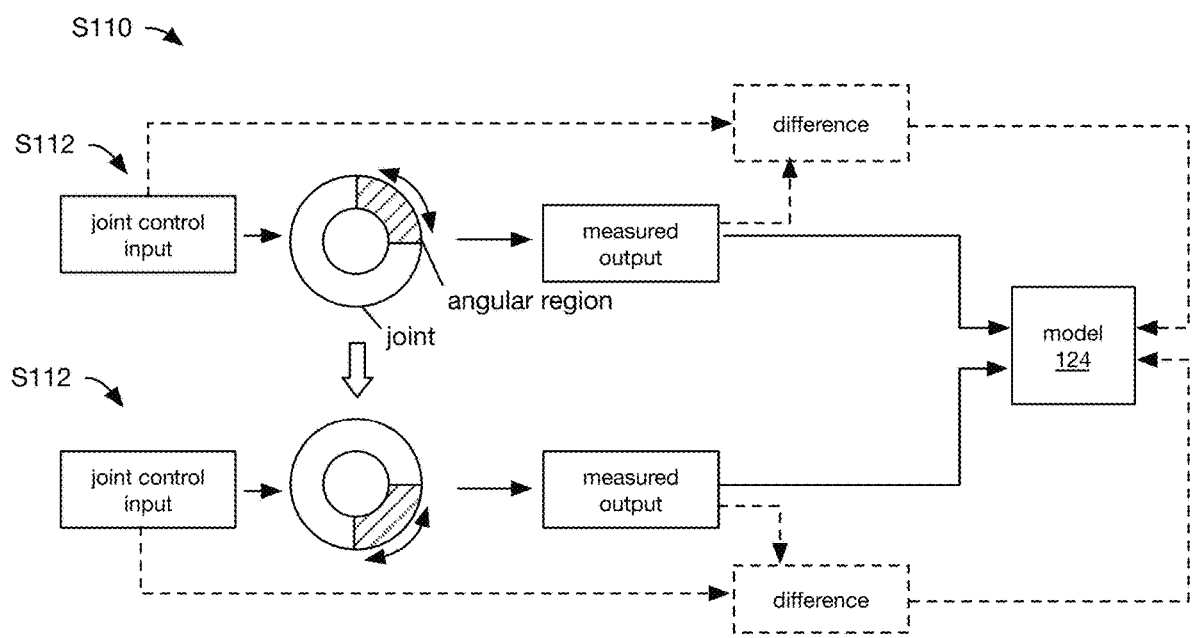
FIG. 11 is a schematic representation of a variant of initializing the joint.

Initializing a joint S112 functions to generate feature data to train a model. S112 can additionally or alternatively function to set a gear tooth relationship of the joint relative to the joint axis. S112 can include: executing an initialization sequence and generating feature data based on the initialization sequence (illustrative example shown in FIG. 11). S112 can optionally include setting a gear tooth mesh of the joint.

Optionally setting the gear tooth mesh of the joint functions locate a home orientation of the mechanical transmission relative to the joint axis (and/or range of motion thereof). The home orientation can be set at an upper bound of the range of motion about the joint axis, lower bound of the range of motion about the joint axis, a center position about the joint axis, and/or any other arbitrary position within the range of motion. The home orientation and/or gear tooth mesh is preferably specified for the full set of components of the joint (e.g., motor, input sensor, transmission mechanism, output sensor), but can additionally or alternatively define the range of motion separately from the motor, with the input and output sensors mounted in fixed positions relative to the drive and driven ends of the transmission mechanism. The gear tooth mesh can be set by an assembly of the joint (by an attachment of the output sensor) and/or can be set in any arbitrary configuration of the assembled transmission mechanism (e.g., motor/transmission pair as received from an OEM, arrangement at inception of initialization sequence, etc.).

S112 can include executing an initialization sequence, which functions to enable generation of feature data. The initialization sequence is preferably predetermined, but can additionally or alternatively be manually determined, dynamically determined, and/or otherwise specified. The initialization sequence can be the same for each joint of an assembly, the same for each similar motor/transmission pair (e.g., for joints having the same gear ratio and/or type of motor), or can be different for each joint (e.g., based on the range of motion of the joint). In a first variant, the initialization sequence can be performed on a test bench or using a test assembly (an example is shown in FIG. 3A). In a second variant, the joint can be initialized in situ, with the joint integrated into an assembly (an example is shown in FIG. 3B).

S112 can include generating feature data based on the initialization sequence. Feature data can include inputs (e.g., control inputs, currents, input positions, etc.), expected outputs, measured outputs, and/or other data. Feature data preferably includes measurements of the positions at the input and output sensors during execution of the initialization sequence, but can additionally or alternatively include motor current data (e.g., from a motor controller or other load monitoring device connected to the motor), input instructions, the difference between the expected output and the measured output (e.g., slop, dead play), and/or any other suitable feature data. Feature data is preferably generated/stored during execution of the initialization sequence, but can additionally or alternatively include feature data from historical operation of the joint, historical operation of similar joints (e.g., for a motor current parameter), and/or any other suitable feature data. Feature data preferably includes sets of (substantially) synchronous measurements from the input sensor (e.g., angular position of the drive end), output sensor (e.g., angular position of the driven end about the joint axis), and/or motor current. However, any other suitable feature data can be generated during S110.

The initialization sequence preferably transforms the joint through a full range of one or more features of the model. In variants, the initialization sequence can include a plurality of distinct data sets which can be used to individually and/or collectively model cumulative error (backlash) across distinct portions of the range of motion of the joint. It can be beneficial to generate data across subsets of the range of motion because greatest contribution to cumulative error/backlash in a transformation commonly occurs when transitioning between a first direction of motion and a second (opposing) direction of motion—such as when transitioning between a clockwise drive motion and anti-clockwise drive motion.

In variants, the initialization sequence can include repeated transformations of the driven end of the joint between a first segment/regime within the range of motion and a second, distinct sector/regime within the full range of motion (examples are shown in FIGS. 5A-D and FIG. 11). In an example, the initialization sequence can include: rotating the motor in an anti-clockwise direction and, concurrently, sampling a first set of synchronous measurements at the first and second encoders comprising the first and second angular positions; based on the first set of synchronous measurements, determining the second rotational position of the driven end is within a first predetermined angular range about the rotational axis; rotating the motor in clockwise direction and, concurrently, sampling a second set of synchronous measurements at the first and second encoders comprising the first and second angular positions; based on the second set of synchronous measurements, determining the second rotational position of the driven end is within a second predetermined angular range about the rotational axis, wherein the second predetermined angular range is offset from the first predetermined angular range; and repeating the aforementioned steps more than a threshold number of times (e.g., for each of a set of load conditions).

In variants, the initialization sequence can include varying the motor load—such as by adjusting the torque applied at the driven end (e.g., an example is shown in FIG. 3A), providing adjustable resistance at the drive end (e.g., applying a torque in opposition to the transformation using a second motor), directly adjusting the motor torque (e.g., at the motor controller), and/or otherwise varying the motor load. Alternatively, the motor load can be unregulated, fixed, arbitrary, and/or in any other suitable state during the initialization sequence.

However, the joint can be otherwise suitably initialized.

S110 can include training a model based on the feature data S114, which functions to train a model (e.g., backlash model) for the joint based on the feature data. The model can then be subsequently used to predict a position of driven end about the joint axis for a planned transformation of the set of features: such as the position at the drive end and/or for a supplied motor current. A controller can therefore adjust a motor control to compensate for backlash in a feedforward configuration to minimize an offset between a control instruction (e.g., trajectory/position of the driven end of the joint) and an actual motion of the driven end of the joint. In a specific example, the model can provide a linear transformation between a position at the drive end of the joint into a predicted position at the driven end of the joint. In a second example, the model can provide a transformation between a position at the drive end and motor load (e.g., current, torque parameter, etc.) into a predicted position at the driven end of the joint.

The model is preferably trained by the model engine, such as using: regression analysis (e.g., linear regression, kernel regression, logistic regression, polynomial regression, etc.), Bayesian networks, genetic algorithms, artificial neural networks, predictive decision trees, support-vector machines, and/or any other suitable ML analysis. However, the model can be otherwise suitably trained based on the feature data.

The model is preferably trained using the feature data values. In a first example, the model can be trained using the inputs as the training inputs and the resultant differences between the expected and measured outputs as the training targets (e.g., wherein the model determines the input adjustment amount to achieve the expected output). In a second example, the model can be trained using the inputs as the training inputs and the respective measured output as the training target (e.g., wherein the model determines a new input for the joint or predicts the joint position based on the input). However, the model can be used using any other suitable set of training data.

Figure 6:
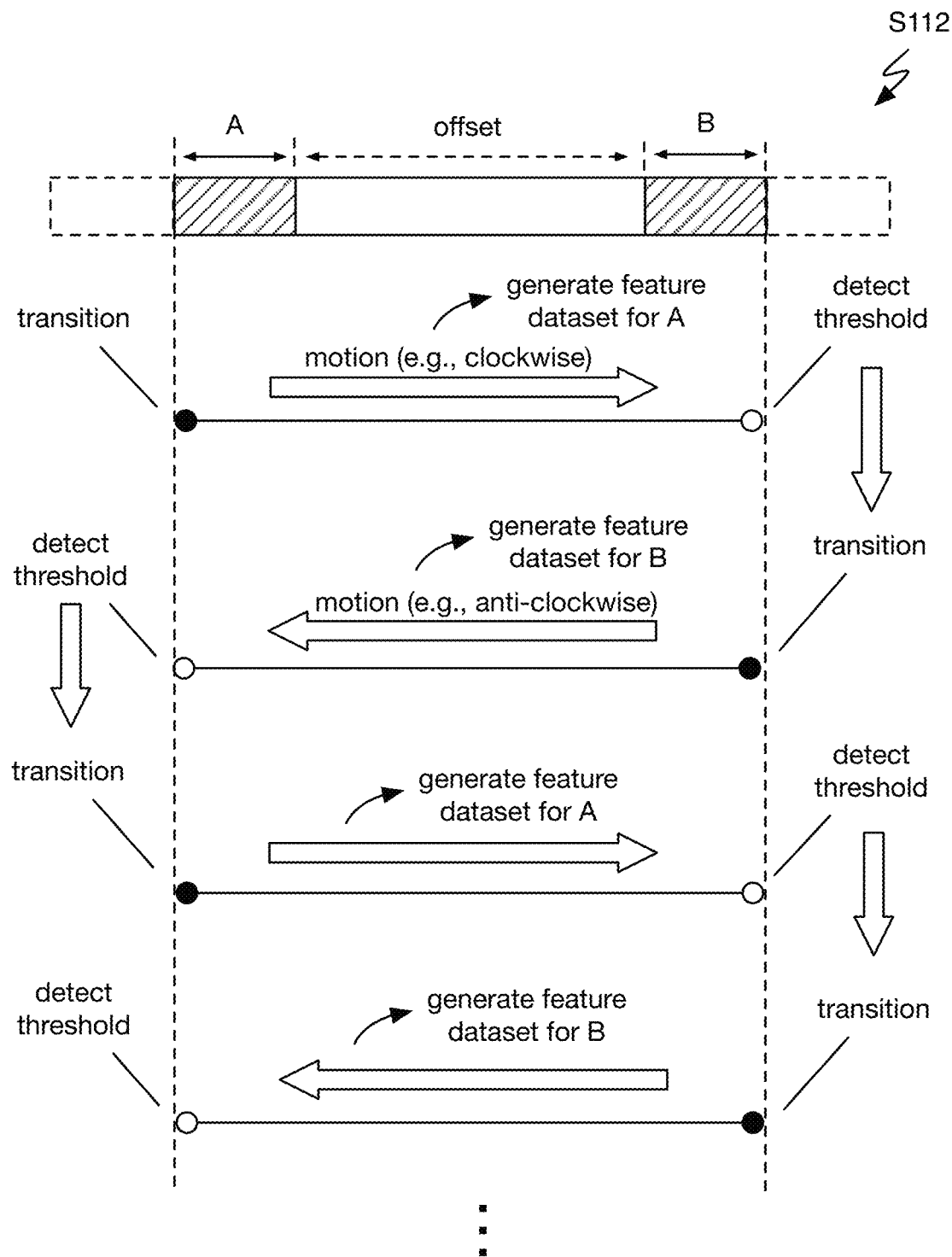
FIG. 6 is a diagrammatic representation of an initialization sequence in a variant of the method.

In variants, the model can include a plurality of sub-models, each trained individually for a predetermined angular range (e.g., sector) within the range of motion about the joint axis. In such variants, the sub-models can be trained based on a subset of the feature data for which the direction of motion transitioned within the predetermined angular range (an example is shown in FIG. 6). Alternatively, the sector (e.g., associated with a current position about the joint axis; associated with the last transition about the joint axis) can be an input feature used to train the model.

Training the model can optionally include updating the model, which functions to refine/improve the model and/or adjust the model based on the mechanical wear of the transmission mechanism. In a first variant, the model is updated by periodic reinforcement learning, based on feature data generated while controlling the joint according to S130. In a second variant, the model can be updated in response to determining satisfaction of an update threshold, such as a wear threshold (e.g., threshold number of cycles of the motor, driven shaft, specific gear, etc.), an error in excess of a threshold tolerance (e.g., once, more than a threshold number of times; control tolerance of the arm and/or joint exceeding a threshold; etc.), threshold quantity of feature data (e.g., stored in a local/remote repository), and/or any other suitable update threshold. In a third variant, updating the model can include executing the initialization sequence and/or retraining the model—such as in response to a servicing of the system (e.g., satisfaction of a service interval threshold), a replacement of one or more hardware components (e.g., spur gear within the transmission), and/or satisfaction of another initialization condition (e.g., positional deviation in excess of a retraining threshold, etc.). However, the model can be updated with any appropriate frequency or else not updated.

However, the model can be otherwise suitably determined.

Optionally forming an assembly with the joint S120 functions to mechanically connect a set of joints (e.g., using a support structure). The assembly is preferably formed after each joint is initialized and/or after executing the initialization sequence, but can be formed with any other suitable timing. Thus, the assembly may be formed after the 'home' position is defined for each joint axis and/or after setting the gear tooth mesh for each joint. Additionally, in variants, the assembly can be formed without persistent power supply to the respective joint(s). In such cases it can be beneficial to retain or constrain the position of the drive end of the joint about the joint axis to preserve the home position and relevance of the model to the individual tooth interactions (e.g., where some gear meshes may be not be periodic for one rotation of the driven end). However, the home position can be preserved by position of an absolute position of the output sensor and/or persistent engagement of various joint components in absence of power.

However, the joint can be otherwise integrated into an assembly or otherwise provided in isolation.

Figure 12:
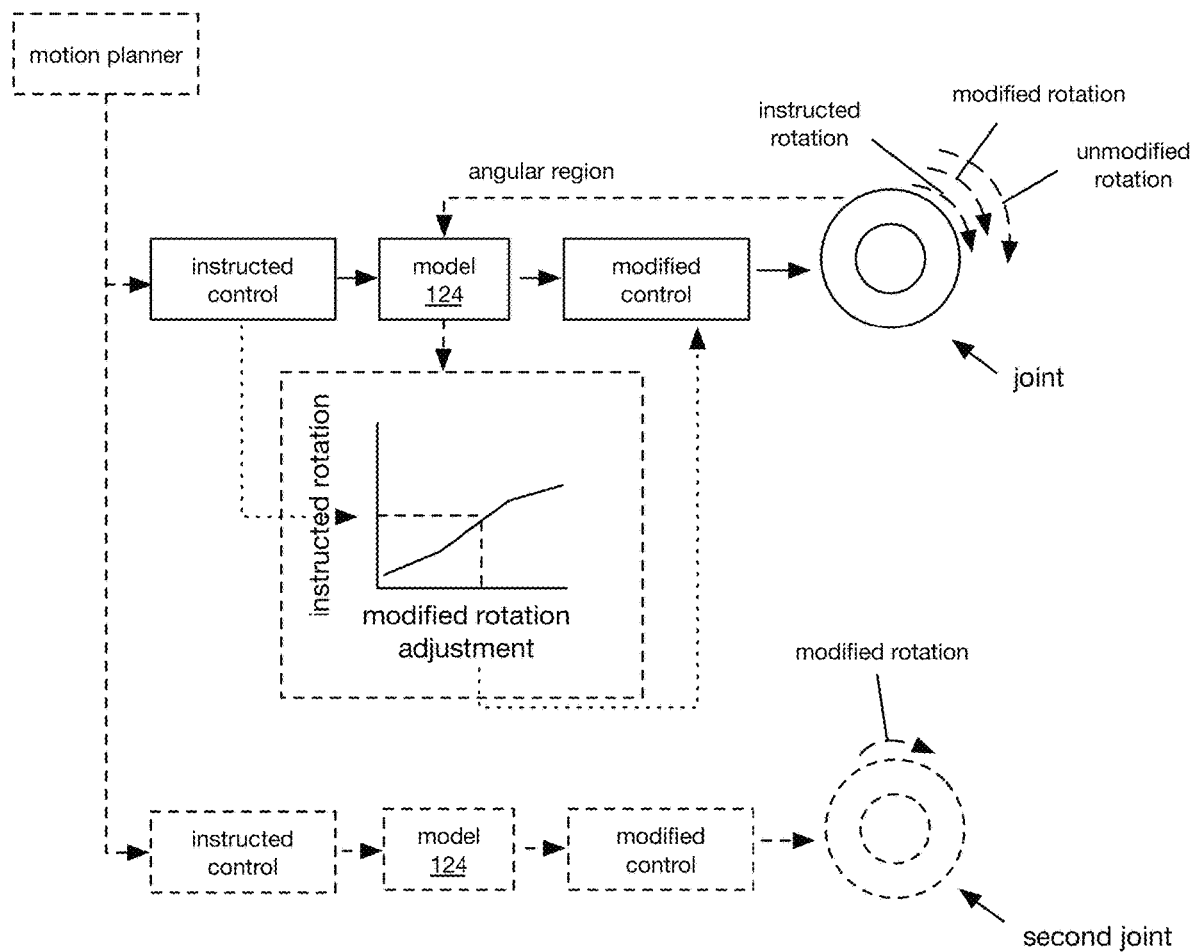
FIG. 12 is a schematic representation of a variant of controlling the joint using the model.

Controlling the joint based on the model S130 functions to effect motion of the assembly (e.g., according to a set of control instructions). S130 can additionally or alternatively function to mitigate backlash effects between gear teeth within the joint based on the gear mesh. Controlling the joint based on the model S130 can include determining control instructions for each joint of the assembly (e.g., trajectory/ motion plan determined by a motion planner), determining joint-specific control based on the joint-specific model (e.g., adjusting based on the specific backlash characteristics of the joint, example shown in FIG. 12), controlling the joint using the joint specific instructions (e.g., feedback loop for the motor control; executing the field-oriented control of the motor, etc.). In a specific example, the controller is configured to control the actuator of each joint according to a set of control instructions, including: based on the first and second rotational positions at a first time, predicting a backlash error resulting at a second time with the respective backlash model for each joint (e.g., performing inference, using the model, etc.); and compensating for the predicted backlash error between the first and second times (e.g., during runtime, etc.).

Controlling the joint can optionally include storing feature data, which may be used to update and/or retrain the model (e.g., periodically, to adjust for wear). Feature data can be stored within a local memory of the controller, at a remote repository (e.g., transmitted via a data connection; an example is shown in FIG. 1), and/or in any other appropriate location. Stored feature data can additionally or alternatively be used to validate a control tolerance—such as by comparing a predicted position of the driven end about the joint axis to a measured position—and/or to detect satisfaction of an update threshold.

However, the joint can be otherwise suitably controlled.

5. Example Model Training

As mentioned above, any suitable machine learning or other technique can be used to develop the models described herein. One example includes an artificial neural network, one example of which is described below. An artificial neural network can use a backpropagation algorithm to learn weights. One goal of backpropagation is to optimize the weights so that the neural network can learn how to correctly map arbitrary inputs to outputs. The neural network can have multiple layers. In this example, the neural network had two layers in addition to the input layer, one hidden layer and one output layer. The input layer included the units that represent the actual encoder outputs. The output layer included the units that represent the angular position of the motor output component in degrees (e.g., measured at the input sensor). The hidden units of the network can be used to extract the underlying features of relationships between the actual encoder outputs and the input degrees given to the motor.

Figure 7:
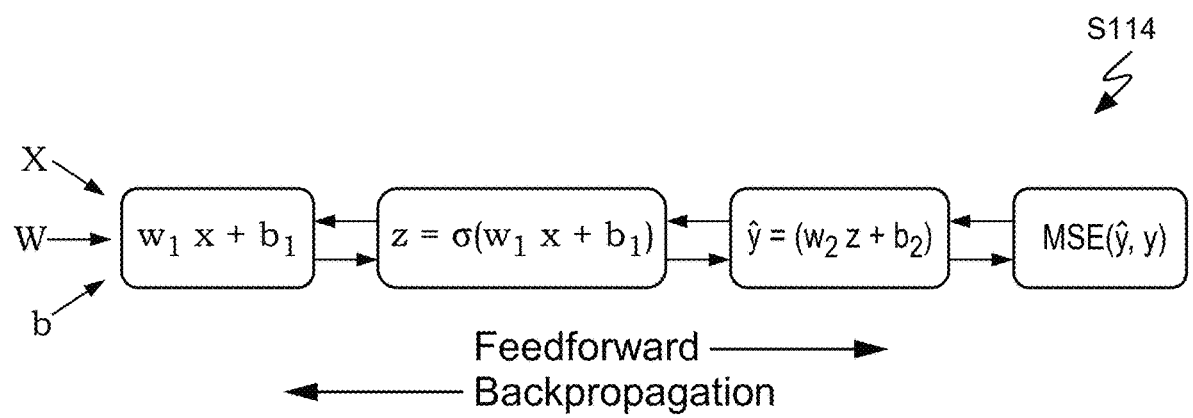
FIG. 7 is an example diagram of training a model in a variant of the method.
Figure 8:
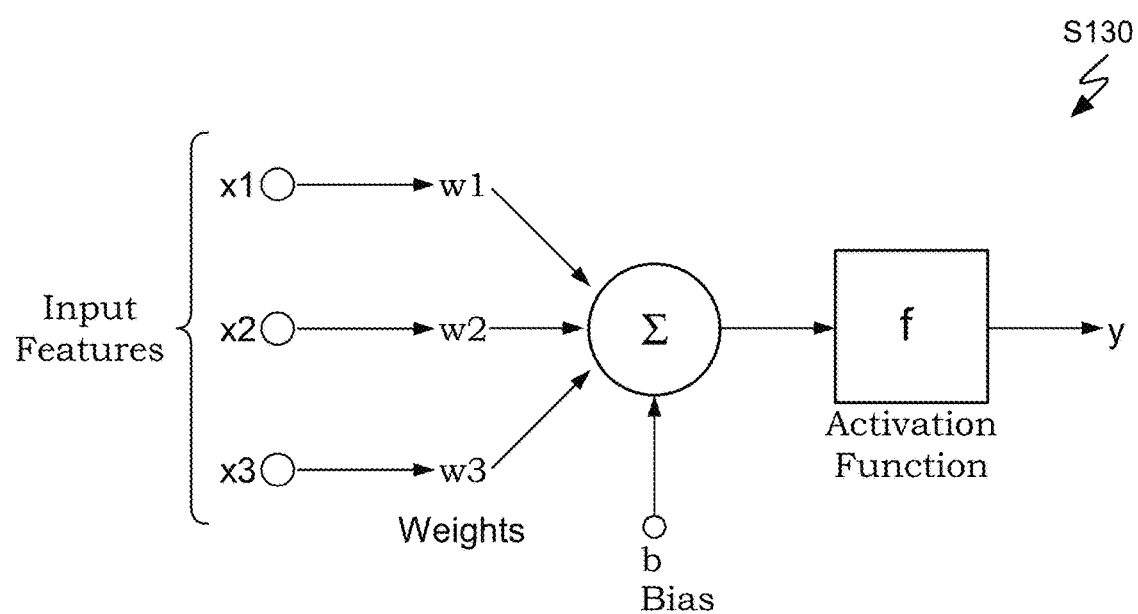
FIG. 8 is an example diagram of a model in a variant of the method.
Figure 9:
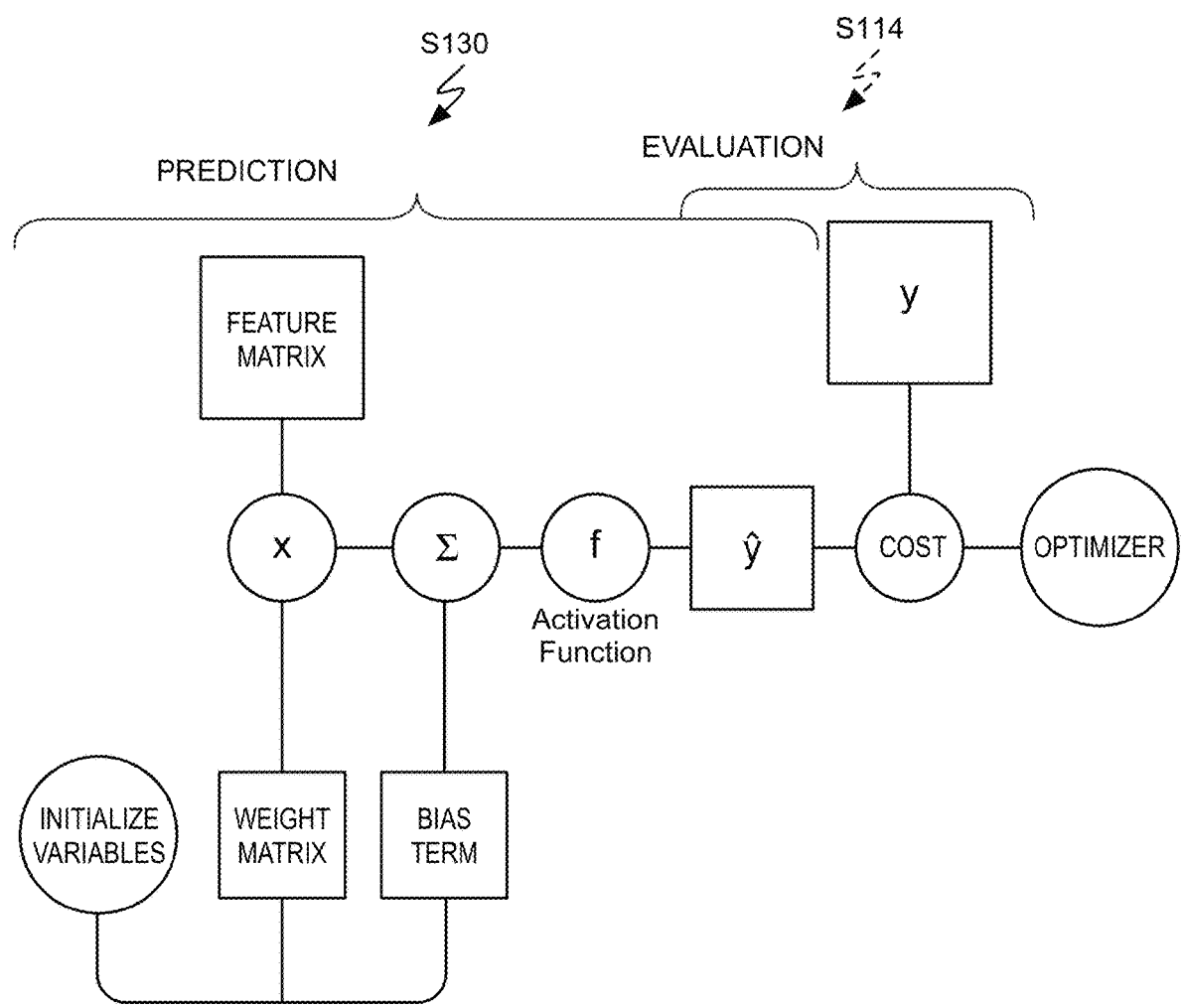
FIG. 9 is an example flow chart diagram for a variant of the method.
Figure 10:
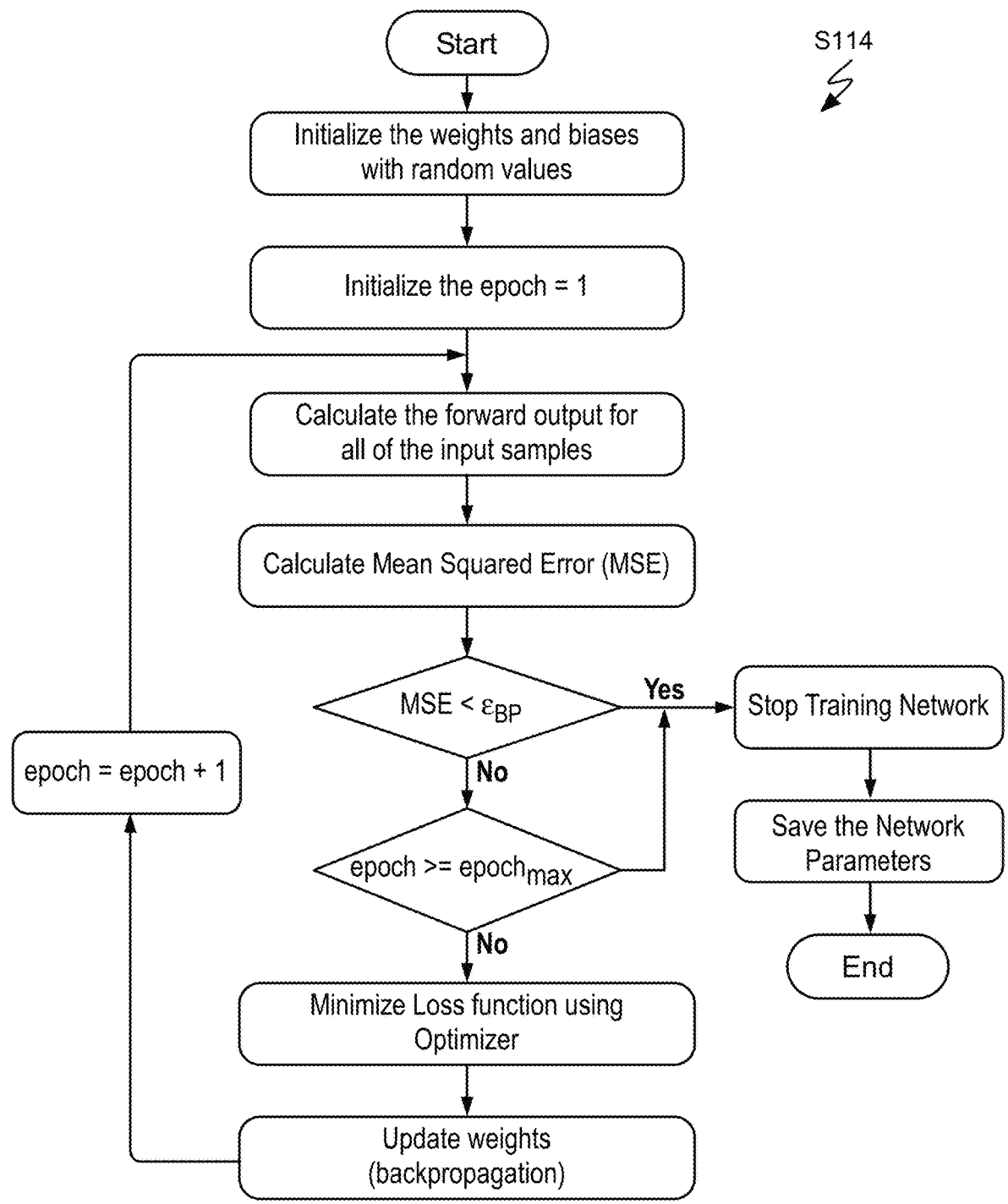
FIG. 10 is an example flow chart diagram for a variant of the method.

The example neural network can have any number of features, e.g., 1, 2, 3, 5, 10, etc. For example, the neural network can have just one feature, e.g., actual (measured) angle at the output sensor (output encoder). The network weights the feature, adds a bias, passes it to an activation function, and outputs a prediction (an example is shown in FIG. 8). One goal of running the tests described above is to find the weights that provide the best fit to the training data. In order to measure the fit, any known technique can be used, e.g., the least squares error over the dataset. This is the sum squared error of our network's predictions over a batch of training dataset, given by the equation: $L(w)=\Sigma_i(\hat{y}-y_i)^2$ In some instances, an optimization algorithm can be used (e.g., the adam optimization algorithm) on the loss's gradient $\nabla_w L(w)$ in order to minimize the overall error on the training data sample. Adam is an adaptive technique that builds on adagrad and further reduces its downside. In some cases, as the optimizer does its work, it will update the weights and biases, thereby obtaining a line that best approximates the change in the drive input degrees over the input feature(s)—examples are shown in FIGS. 7, 9, and 10.

As mentioned above, additional features can be implemented to make the model more robust. Certain features like sector information and load variation can have notable impact on the cumulative error in a mechanical system. With multiple features, the model can include a linear combination of features to produce one output, e.g., $y_i=h(x_i, w)=w^T x_i$. The network may be modified in order to train a multi-feature model. In such instances, the input layer can include units that represent the input features. The output layer can include the same or different units. The hidden units can be used to learn relationships between the input features and the inputs described above (e.g., motor inputs).

In various embodiments, the network can take as an input a data point with multiple features, e.g., actual (measured) output sensor angle, sector along the joint axis, and load; weights the features; add a bias and sum them up; pass it to activation function; and thereby output a prediction—an example diagram of this process is illustrated in FIG. 8.

6. System and Method Examples

In one example, a system includes: a set of joints mechanically connected to a base, each joint defining a respective rotational axis of the system, each joint including: an actuator comprising an actuator output component; a mechanical transmission defining a drive end connected to the actuator output component and a driven end rotatable about the rotational axis of the joint; a first encoder connected to the drive end and configured to sample a first rotational position of the drive end; and a second encoder connected to the driven end and configured to sample a second rotational position of the driven end; and a controller electrically connected to the actuator, first encoder, and second encoder of each joint, the controller comprising a backlash model for each joint of the system, wherein the controller is configured to control the actuator of each joint according to a set of control instructions, including: based on the first and second rotational positions at a first time, predicting a backlash error resulting at a second time with the respective backlash model for each joint; and compensating for the predicted backlash error between the first and second times.

In one example, the mechanical transmission consists of a plurality of spur gears.

In one example, the controller is configured to control the actuator with a feedback loop based on the first rotational position and an actuator current.

In one example, for each joint, the mechanical transmission includes a plurality of spur gears meshed in a unique tooth arrangement relative to a home orientation about the rotational axis, wherein the backlash model of each joint is determined for the unique tooth arrangement before the joints are mechanically connected.

In one example, the backlash model of each joint is trained on backlash data specific to the respective joint.

In one example, each backlash model is unchanged during control of the actuator of the respective joint.

In one example, each joint defines a maximum control tolerance of less than 0.1 degrees, wherein a maximum backlash of the mechanical transmission is greater than the control tolerance.

In one example, the control tolerance of each joint is about 0.05 degrees, wherein the maximum backlash of the mechanical transmission is at least 0.15 degrees.

In one example, the second encoder of each joint is an absolute encoder, wherein a span of an angular range of motion of the driven end of each joint about the respective rotational axis is limited to a single revolution or less.

In one example, the set of joints includes six joints, wherein the system is a 6-axis robotic arm.

In one example, a method including: initializing a coordinate frame of a joint, the coordinate frame including a rotational axis of the joint, the joint including a mechanical transmission, the mechanical transmission including a drive end defining an input position and a driven end defining an output position about the rotational axis of the joint; wherein initializing the joint includes, for each of a plurality of distinct angular sectors about the rotational axis: performing an initialization sequence; during the initialization sequence, sampling synchronous measurements of the first rotational position and second rotational position, respectively; determining a backlash model based on the synchronous measurements associated with each of the plurality of distinct angular ranges; after initializing the coordinate frame and after determining the backlash model, forming an assembly with the joint; and wherein the assembly is configured to be controlled based on the backlash model and the coordinate frame.

In one example, the initialization sequence includes repeatedly transitioning from a first direction of rotation about the rotational axis to a second direction opposite the first direction of rotation.

In one example, determining the backlash model includes: at a machine learning (ML) engine, training the backlash model independently for each of the plurality of distinct angular sectors, wherein the synchronous measurements of the input and output positions are features used to train the backlash model.

In one example, the backlash model includes a regression model trained on the features.

In one example, the features used to train the backlash model further comprise a joint load.

In one example, the method further includes: while controlling the assembly, sampling measurements of the first and second positions, wherein the control of the assembly comprises closed loop feedback control based on the measurements; sending the measurements to remote repository; determining satisfaction of an update threshold; and in response to determining satisfaction of the update threshold, updating the backlash model by reinforcement learning for the backlash model and the measurements.

In one example, the update threshold is determined based on a mechanical wear of the mechanical transmission.

In one example, a method includes: controlling a joint based on a backlash model specific to the joint and a coordinate frame including a rotational axis of the joint, wherein the backlash model was trained based on training data generated for a set of distinct angular sectors and measured rotational positions of the joint for each distinct angular sector; wherein the joint includes a mechanical transmission, the mechanical transmission including a drive end defining an input position and a driven end defining an output position about the rotational axis of the joint; wherein controlling the joint includes: based on the input and output positions at a first time, predicting a backlash error resulting at a second time with the respective backlash model for each joint; and compensating for the predicted backlash error between the first and second times.

In one example, the joint is part of an assembly formed after the backlash model was trained.

In one example, a coordinate frame of the joint is initialized before the assembly is formed.

In one example, the training data is determined by: performing an initialization sequence, including repeatedly transitioning, within the distinct angular sector, from a first direction of rotation of the driven end to a second direction opposite the first direction of rotation; and during the initialization sequence, sampling synchronous measurements of the first rotational position and second rotational position at a first encoder connected to the drive end and a second encoder connected to the driven end, respectively Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system comprising:
    a set of joints of a robot arm, each joint comprising:
        an actuator;
        a transmission defining a drive end connected to an output of the actuator and a driven end rotatable about a rotational axis of the joint; and
        a first and second sensor connected to the drive end and the driven end of the joint, respectively, and configured to sample positions of the drive end and the driven end, respectively; and
    a controller comprising a respective backlash model for each joint of the robot arm, wherein the controller is configured to control the actuator of each joint according to a set of control instructions to compensate for a predicted backlash error between the drive end and the driven end, based on the positions of the drive end and the driven end, using the respective backlash model,
    wherein each joint defines a maximum control tolerance of less than 0.1 degrees, wherein a maximum backlash of the mechanical transmission exceeds the maximum control tolerance.

2. The system of claim 1, wherein the transmission comprises a plurality of spur gears.

3. The system of claim 2, wherein the transmission comprises a planetary gearbox.

4. The system of claim 1, wherein for each joint, the transmission comprises a plurality of gears meshed in a unique tooth arrangement relative to a reference orientation about the rotational axis, wherein the backlash model of each joint is predetermined for the unique tooth arrangement.

5. The system of claim 1, wherein the set of joints comprises a first joint and a second joint, wherein a first backlash model for the first joint is different from a second backlash model for the second joint, wherein the first and second backlash models are associated with a unique arrangement of a first transmission of the first joint and a second transmission of the second joint, respectively.

6. The system of claim 1, wherein each respectively backlash model comprises a regression model.

7. The system of claim 1, wherein each respective backlash model is independently trained for each joint over a plurality of distinct angular sectors.

8. The system of claim 1, wherein the backlash model of each joint is trained on backlash data specific to the respective joint.

9. The system of claim 1, wherein each backlash model is unchanged during control of the actuator of the respective joint.

10. The system of claim 1, wherein a set of input features for the respective backlash model of each comprise: a position of the drive end, a position of the driven end, and a joint load.

11. The system of claim 1, wherein the controller is configured to control the actuator with a feedback loop based on the position of the drive end, sampled by the first sensor, and an actuator current.

12. The system of claim 1, wherein the second sensor comprises an absolute encoder.

13. The system of claim 12, wherein a span of an angular range of motion of the driven end of each joint about the respective rotational axis is limited to a single revolution or less.

14. The system of claim 1, wherein the robot arm is a 6-axis robot arm.

15. A method comprising:
measuring a first and a second position of a drive end and a driven end of a gearbox, respectively; and
based on a set of control instructions associated with a target output for the drive end of the gearbox, controlling an actuator coupled to the drive end, comprising:
using a backlash model for the gearbox, predicting a backlash error between the drive end and the driven end based on the first and second positions; and
compensating for the predicted backlash error,
wherein the target output defines a maximum control tolerance of less than 0.1 degrees, wherein a maximum backlash of the gearbox exceeds the maximum control tolerance.

16. The method of claim 15, further comprising: determining a load parameter, wherein the backlash error prediction is based on the load parameter.

17. The method of claim 15, wherein the backlash model is predetermined for a unique gear mesh arrangement of the gearbox relative.

18. The method of claim 15, wherein the backlash model comprises a regression model which has been independently trained over a plurality of distinct angular sectors within a fixed range of motion of the gearbox.

19. The method of claim 15, wherein the gearbox comprises a plurality of spur gears.

* * * * *